US005852081A

United States Patent [19]

Hayashi et al.

[11] Patent Number: 5,852,081

[45] Date of Patent: Dec. 22, 1998

[54] INK COMPOSITION FOR THERMAL TRANSFER SHEET AND THERMAL TRANSFER SHEET UTILIZING SAME

[75] Inventors: Masafumi Hayashi; Mitsuru Maeda, both of Tokyo-to; Norikatsu Kobayashi, Yokohama, all of Japan

[73] Assignee: Dai Nippon Printing Co., Ltd., Tokyo-to, Japan

[21] Appl. No.: 839,148

[22] Filed: Apr. 23, 1997

[30] Foreign Application Priority Data

Apr. 30, 1996 [JP] Japan .................................... 8-130622

[51] Int. Cl.[6] ................................ C08K 5/34; B32B 9/04

[52] U.S. Cl. ............................. 524/90; 428/704; 503/227

[58] Field of Search ............................... 524/90; 503/227; 428/704

[56] References Cited

U.S. PATENT DOCUMENTS

| | | | |
|---|---|---|---|
| 3,929,719 | 12/1975 | Pugin et al. | 524/90 |
| 3,996,191 | 12/1976 | Pugin et al. | 524/90 |
| 4,636,258 | 1/1987 | Hayashi et al. | 106/31 |

*Primary Examiner*—Kriellion S. Morgan
*Attorney, Agent, or Firm*—Ladas & Parry

[57] ABSTRACT

A thermal transfer sheet comprises a substrate film and a heat fusible ink layer disposed on one surface of the substrate film, in which the heat fusible ink layer is formed from an ink composition comprising a coloring agent and a heat fusible binder, said coloring agent comprising a violet pigment expressed by the following formula:

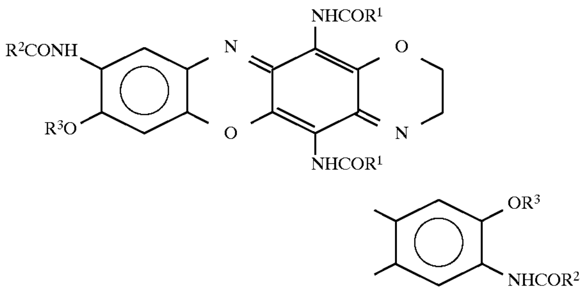

(in the formula, each of $R^1$ and $R^3$ is any one of a methyl and an ethyl and $R^2$ is a phenyl), and said heat fusible binder mainly comprising a wax.

7 Claims, 1 Drawing Sheet

INK COMPOSITION FOR THERMAL TRANSFER SHEET AND THERMAL TRANSFER SHEET UTILIZING SAME

BACKGROUND OF THE INVENTION

The present invention relates to an ink composition for a thermal transfer sheet and also to a thermal transfer sheet particularly for providing a printed image having an improved clearness and waterproof property.

In a conventional art, when it is required to print output prints from computers and word processors through a thermal transfer system, there are used thermal transfer sheets, each having a substrate film having one surface on which a heat fusible ink layer is formed.

Such thermal transfer sheet is manufactured by using, as a substrate film, a paper having a thickness of 10 to 20 $\mu$m such as condenser paper or paraffin paper, or a plastic film having a thickness of 2 to 20 $\mu$m such as polyester film or cellophane film and providing, through a coating process, a heat fusible ink layer prepared by mixing a wax with a coloring agent such as pigment or dye.

These thermal transfer sheets have been mainly utilized for printing letters and forming color images, and when used for the letter printing, a pitch-black tone is required, and when used for the color image formation, yellow, magenta and cyan tones having high value and chroma are required. However, when such thermal transfer sheet is used, for example, for posters, display of school-color, advertisement, handbills, or the like requiring specific colors, there are some cases requiring printed images having specific tones except a case of using black color.

In order to satisfy such requirement, in principle, it is enough to carry out multi-color printing by using a thermal transfer sheet of four colors including black color. In actual, however, this process requires much cost, and moreover, it is difficult to reproduce a required tone. Therefore, in the conventional method mentioned above, such requirement cannot be completely satisfied. For example, when a printed image of violet color is required, one conventional example used a C.I. pigment violet 23(51319) as a pigment. In the use of such pigment, however, the printed image provided less waterproof property, and hence, it is not suitable for an outdoor use.

SUMMARY OF THE INVENTION

An object of the present invention is to substantially eliminate defects or drawbacks encountered in the conventional art and to provide an ink composition for a thermal transfer sheet and the thermal transfer sheet capable of providing a printed image having an improved clearness and waterproof property.

This and other objects can be achieved according to the present invention by providing an ink composition for a thermal transfer sheet comprising: (1) a coloring agent comprising a violet pigment expressed by a following formula:

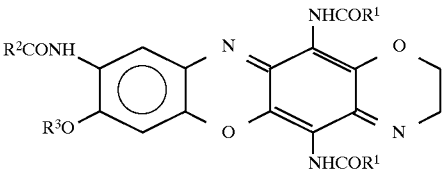

-continued

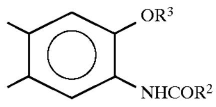

(in the formula, each of $R^1$ and $R^3$ is any one of a methyl and an ethyl and $R^2$ is a phenyl); and (2) a heat fusible binder mainly comprising a wax.

There is also provided a thermal transfer sheet comprising: (1) a substrate film; and (2) a heat fusible ink layer disposed on one surface of the substrate film, said heat fusible ink layer being formed from the ink composition described above.

In preferred embodiments, the violet pigment has an oil absorption property in a range of 30–60 g/100 g (oil/pigment). In another preferred embodiment, amounts of the violet pigment and the heat fusible binder are in ranges of 1–50 weight parts and weight 10–100 parts, respectively. The thermal transfer sheet of the present invention may further comprise a transfer-receiving material which is peelably bonded to a surface side of the thermal transfer sheet.

According to the present invention of the characters described above, there is provided a thermal transfer sheet having a printed image improved in clearness and the waterproof property by using a specific pigment of the structure described above.

DESCRIPTION OF THE PREFERRED EMBODIMENT

Figure 1:
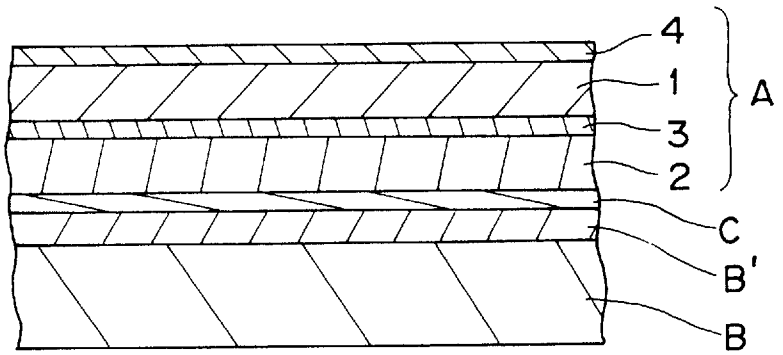
FIG. 1 is a schematic sectional view of a second thermal transfer sheet according to the present invention.

The present invention will be described further in detail hereunder with reference to preferred exemplary embodiments thereof.

The pigment used for the ink composition of the present invention is expressed by a following formula:

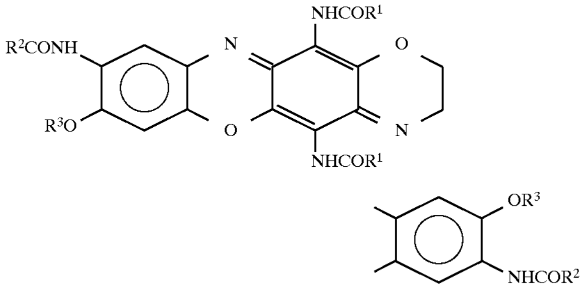

(in the formula, each of $R^1$ and $R^3$ is any one of methyl group and ethyl group and $R^2$ is phenyl group); and (2) a heat fusible binder mainly comprising a wax.

That pigment has been utilized in various fields such as printing ink, coating material, coloring agent for resin, color toner, thermal transfer sheet, etc., and for example, a C.I. pigment violet 37 (Trade Name: CHROMOPHTAL VIOLET B manufactured by Ciba Geigy) will be listed up.

Although, as such pigment, there exist pigments having various particle diameters, it is desirable for the present invention to use a pigment having an oil absorption property in a range of 30–60 g/100 g (oil/pigment), preferably, of 40–50 g/100 g in consideration of coloring property and dispersion property of the pigment in the wax, and clearness and waterproof property of the printed image.

The coloring agent used for the present invention includes the above-mentioned pigment as a main component, but small amount of other pigments may be mixed for the purpose of toning, etc.

As a heat fusible binder to be mixed with the above-mentioned pigment, there will be provided a wax and a mixture of the wax as a main component and other components, such as drying oil, resin, mineral oil and derivatives of cellulose and rubber. As a typical example of the wax, there will be listed up micro-crystalline wax, carnauba wax or paraffin wax. Furthermore, the following waxes may be used: Fischer-Tropsch wax, various kinds of low molar weight polyethylenes, Japan tallow, bees wax, spermaceti wax, insect wax, wool wax, shellac wax, candelilla wax, petrolatum, polyester wax, partially denatured wax, fatty acid ester, fatty acid amide, and so on. According to the present invention, a thermoplastic resin having relatively low melting point may be mixed with the above mentioned wax to thereby improve the bonding ability of the heat a fusible ink layer to the material to be transferred, i.e. transfer receiving material. In preferred example, the heat fusible binder and the pigment mixture may be optionally arranged in contents so as to be in ranges of 10 to 100 weight parts and 1 to 50 weight parts, respectively.

The ink composition according to the present invention may be prepared by melting and kneading the above pigment, the heat fusible binder and various kind of additives, for example dispersion agent, which may be added as occasion demands, and by dispersing the pigment uniformly in the heat fusible binder. Further, the pigment may be dispersed by using, as dispersion medium, water, organic solvent or a mixture thereof, and as this result, the ink composition may have a form of emulsion or dispersion solution which is in a liquid state in a normal, i.e. room, temperature.

Furthermore, the ink composition of the present invention may be prepared in the manner that the pigment solely or together with the dispersion agent is dispersed in water, organic solvent or a mixture thereof to obtain a pigment dispersion solution, and on the other hand, the heat fusible binder is emulsified, dispersed or dissolved in water, organic solvent or a mixture thereof to obtain a vehicle, and thereafter the above mentioned pigment dispersion solution and the vehicle are mixed with each other. In the case where such liquid state ink composition is prepared, it will be preferred to form as the emulsion solution or dispersion solution of about 5 to 70 weight % in solid component in consideration that such liquid state ink composition should be utilized for formation of the heat fusible ink layer.

The first thermal transfer sheet of the present invention can be obtained by applying the ink composition of the characters mentioned above to one surface of a proper substrate film and then drying the same as occasion demands to form the heat fusible ink layer.

As the substrate film used for the thermal transfer sheet of the present invention, a substrate film which has been used for a conventional thermal transfer sheet will be used as it is, but it is not limited thereto and other ones may be used.

Preferably, the following substrate film materials may be listed up: plastic such as polyester, polypropylene, cellophane, polycarbonate, cellulose acetate, polyethylene, polyvinyl chloride, polystyrene, nylon, polyimide, polyvinylidene chloride, polyvinyl alcohol, fluorine resin, chlorinated rubber and ionomer; paper such as condenser paper and paraffin paper; or nonwoven fabric. The substrate film may be formed in composite form of these materials. Although the thickness of the substrate film may be optionally changed in accordance with a material to be used so as to provide suitable strength and heat conductivity, it is preferably 2 to 25 μm, for example.

The ink composition mentioned above may be applied to the substrate film in the following manners. When the ink is in form of solid state in a normal temperature, a hot melt coating method or a hot lacquer coating method in which a small amount of a solvent is added, is usable. On the other hand, when the ink is in form of emulsion, an emulsion coating method is preferably utilized.

Further, when the heat fusible ink layer is formed, a transparent layer composed of a wax may be preliminarily formed on the surface of the substrate film so that the transferred image after the transfer process has a surface layer, and in this case, such wax layer may be formed from an emulsion prepared by emulsifying or dispersing the wax in the water, the organic solvent or the mixture thereof.

Furthermore, in order to give the mat feeling to the printed matter or to give contract or antistatic property to the thermal transfer sheet, a mat layer provided with contract and antistatic property may be formed on the surface of the substrate film. Such mat layer is generally formed by applying a coating solution prepared by dispersing and dissolving a polyester resin and a carbon black in a solvent.

Still furthermore, according to the present invention, a surface layer having a thickness of about 0.1 to 10 μm (0.05 to 5 $g/m^2$ as solid component coat amount) may be further formed on the surface of the thus formed heat fusible ink layer. The surface layer may be formed of, for example: thermo-plastic resin such as ethylene-vinyl acetate copolymer, ethylene-acrylic acid ester copolymer, polyethylene, polystyrene, polypropylene, polybutene, vinyl chloride resin, vinyl chloride-vinyl acetate copolymer and acrylic resin; and various kinds of wax.

Although the basic structure or composition of the thermal transfer sheet of the present invention is described above, a slip layer may be of course formed on a back surface of the thermal transfer sheet for preventing the adhesion of the thermal head and improving a smooth sliding ability.

Figure 2:
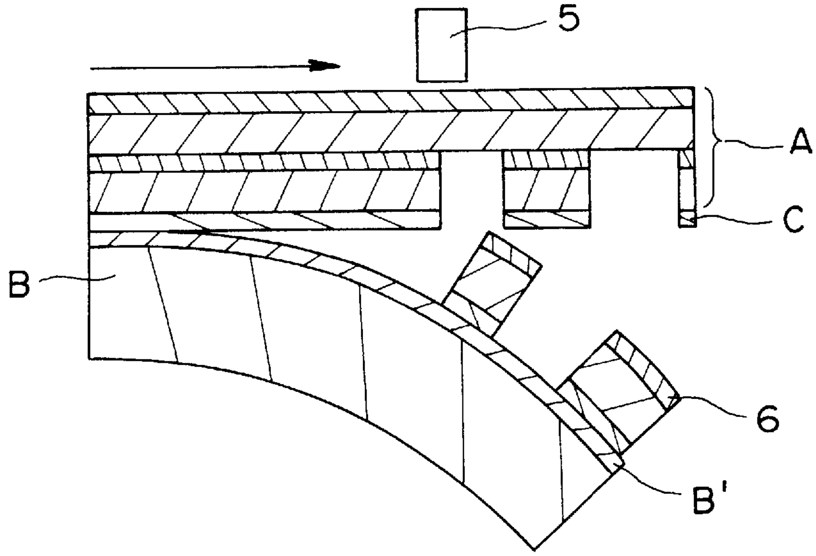
FIG. 2 is a schematic sectional view of the second transfer sheet of FIG. 1 in a use state thereof.

One preferred example of the second thermal transfer sheet of the present invention will be shown in FIGS. 1 and 2, in which a thermal transfer sheet A and a transfer-receiving material B to be transferred is temporarily (i.e., peelably) bonded through an adhesive or a bonding agent layer C. In these FIGS., reference numeral 1 is the substrate film, reference numeral 2 is the heat fusible ink layer, reference numeral 3 is the mat layer, reference numeral 4 is the slip layer, reference numeral 5 is a thermal head and reference numeral 6 is the transferred image. Besides, reference mark B' is a pigment layer.

There is used, for example, as the transfer-receiving material B, parchment paper, plastic film, synthetic paper, normal paper, fine paper, PPC paper, art paper, light coat paper, coat paper, cast coat paper, or coated paper such as slightly-coated paper. Although such transfer-receiving material B may be a separate-type sheet having A-size, B-size or the like size, a continuous sheet having an optional width will be preferred.

Although there is also used a known bonding agent as the adhesive layer C for temporarily bonding the thermal transfer sheet A to the transfer-receiving material B, it will be preferred to use an adhesive composed of (1) a viscous resin having a low glass transition temperature or adhesive particles and (2) a wax. An acrylic group resin will be generally used for the viscous resin having a low glass transition temperature. An EVA particle, ionomer particle or the like may be used as the adhesive particle. It is preferred that such adhesive layer has a adhesive strength (g) of 300 to 2000 g at a time when a sample is cut out so as to have a size of 25 mm (width)×55 mm (length), and the adhesive strength of the sample is measured at a pulling speed of 1800 mm/min. with use of a surface friction measuring machine (HEIDON-14, manufactured by SHINTO KAGAKU).

In a case where the adhesive strength is less than the above range, the adhesive strength between the thermal transfer sheet A and the transfer-receiving material B is low and both the materials will be hence easily peeled and crinkling will be easily formed in the width direction of the thermal transfer sheet at the time of printing. On the other hand, in a case where the adhesive strength exceeds the above range, although a sufficient adhesive strength is realized, the ink layer is easily transferred to a non-printing portion of the transfer-receiving material, causing contamination to the transfer-receiving material. Further, in the case of high adhesive strength, it will be difficult to peel off the thermal transfer sheet after the printing.

Although the above adhesive layer C may be formed on the surface of the transfer-receiving material B, in such case, the viscous property remains to the printed matter. Accordingly, it is preferred that the adhesive layer C is formed to the surface of the ink layer 2 of the thermal transfer sheet so as to be peelable from the transfer-receiving material B, and in this case, since the viscous resin or adhesive resin is used as an aqueous emulsion, the ink layer is not damaged, thus being available. The coating method and drying method of the emulsion are not limited to specific ones. It is also preferred that the adhesive layer has a thickness of 0.1 to 10 $\mu$m (0.05 to 5 g/m$^2$ as solid component coat amount).

Furthermore, it is preferred that the bonding of the thermal transfer sheet A to the transfer-receiving material B is performed by continuously bonding the transfer-receiving material B while forming the adhesive layer C on the surface of the ink layer of the thermal transfer sheet A and winding up it in a form of roll, and when rolled, the thermal transfer sheet may be positioned outside or inside, or may be cut in a plurality of sheet pieces.

The transfer-receiving material B may be provided with a pigment layer B' as a surface layer on its printing surface to thereby enable the thermal transfer sheet and the transfer-receiving material to be kept in good condition for a long term and to prevent the transfer-receiving material B from damaging, contaminating or cracking even if a small impact be given thereto. The pigment layer B' may be formed of a pigment material composed of a pigment of 100 weight parts and the binder of 3 to 15 weight parts, in the composed ratio.

The formation of such pigment layer B' on the surface of the transfer-receiving material B will be performed by applying, and then drying, a coating solution prepared by dispersing a pigment for paper (i.e., filler) such as white pigment (for example, kaoline, calcium carbonate, satin-white, titanium dioxide, aluminum hydroxide) into latex including a binder such as SBR, NBR or starch or into a binder solution to the surface of the transfer-receiving material. In this formation, the solid component ratio of the pigment and the binder used is preferably of 3 to 15 weight parts of the binder with respect to 100 weight parts of the pigment. Further, in the coating solution, an additive known in a paper coating technology may be of course contained.

In the case of less amount of the binder to be used in the pigment, the pigment layer will be easily damaged and peeled off, thus being inconvenient, and on the other hand, in the case of excessive amount of the binder to be used, the cohesive strength of the pigment layer to be formed becomes too large to obtain a desired contamination or crack preventing effects. Further, the desired coat amount of the pigment layer is in a range of 5 to 30 g/cm$^2$ in solid component. A calender treatment may be carried out after the coating for improving the printing performance.

With reference to FIG. 2, a desired image 6 may be formed on the transfer-receiving material B by setting the thermal transfer sheet of the present invention of the characters described above to a large size plotter, conveying it in a direction shown by an arrow in FIG. 2 and peeling off the transfer-receiving material B after the printing by means of the thermal head 5.

EXAMPLE

The present invention will be described hereunder more in detail by way of experiment examples, in which term "part(s)" or "%" generally denote weight part(s) or weight %, though not mentioned specifically.

Example 1

The following components were fused and kneaded by a sand mill at a temperature of about 110°–120° C. for about two hours to obtain an ink composition (violet color) according to the present invention.

<Ink Composition>

Violet pigment (oil absorption amount 45 g/100 g) in the formula mentioned hereinbefore in which $R^1$ is a methyl, $R^2$ is a phenyl and $R^3$ is an ethyl: 8 parts Carnauba wax: 10 parts Ethylene-vinyl acetate copolymer: 10 parts Paraffin wax: 62 parts

Example 2

A thermal transfer sheet according to the present invention was obtained by: using a polyethylene terephthalate film having a thickness of 4.5 $\mu$m with a slip layer formed on its back surface, as a substrate film; applying a mat layer forming ink having the following composition at an amount of 0.5 g/m$^2$ in solid component to the front surface of the substrate film; drying the same at a temperature of 90° C. to form the mat layer; fusing the ink composition of the above Example 1 at a temperature of about 110°–120° C.; and then applying the same to the surface of the mat layer through a hot-melt coating method to form a heat fusible ink layer at an amount of about 3 g/m$^2$.

<Mat Layer Forming Ink>

Polyester resin: 20 parts

Carbon black: 20 parts

Toluene: 30 parts

Methyl ethyl ketone: 30 parts

Example 3

A thermal transfer sheet according to the present invention was obtained by: applying a temporary bonding agent having the following components to the surface of the heat fusible ink layer of the thermal transfer sheet of the above Example 2 through a gravure-coating process at an amount of 0.5 g/m$^2$ in a dried state; laying it on a coat paper as a transfer-receiving material; and then bonding to each other through a nipping process at a temperature of 50° C. and at a nipping pressure of 5 $Kg/cm^2$.

<Temporary Bonding Agent>

Acrylic group viscous resin dispersion (solid component of 40%, glass transition temperature of −58° C.): 10 parts Carnauba wax group aqueous dispersion (solid component of 40%, melting point of 83° C.): 15 parts water: 10 parts Isopropanol: 20 parts Example 4

A pigment layer forming solution having a solid component of 60% was prepared by mixing and dispersing starch, kaoline, calcium carbonate and water in the SBR latex (SBR aqueous dispersion) having solid component of 40% so as to provide the following composition in solid component. A transfer-receiving material is obtained by: applying the pigment layer forming solution described above to one surface of a fine paper (64 $g/M^2$) as a substrate at an amount of 15 $g/m^2$ as the solid component by a blade coater; and drying the same to form the pigment layer.

A thermal transfer sheet according to the present invention was obtained in substantially the same manner as that of the Example 3 except the use of the above transfer-receiving material.

<Pigment Layer Forming Solution (solid component)>

Kaoline: 95 parts

Calcium carbonate: 5 parts

SBR: 7 parts

Starch: 1 part

[Comparative Example]

A thermal transfer sheet as a comparative example was prepared by using a C.I. pigment violet 23 (51319) in place of the pigment in the Example 1 and other components which are the same as those in the Examples 1 and 2.

[Example of Use]

Printing operations were carried out by using the thermal transfer sheets prepared in the above Examples 2–4 and the Comparative Example by using a test machine under the following conditions, and the thus obtained printed images were evaluated, the evaluation results being shown in the following Table 1.

<Printing Condition>

Thermal head: 200 dpi, "thin film portion glaze" type

Applied energy: 0.5 mJ/dot

Applied pressure: 4 kg

Printed pattern: half tone, solid, vertical one dot line, horizontal one dot line.

<Criteria for Evaluation>

Clearness: Coloring conditions after the transferring were evaluated through visual observation.

Waterproof property: Coloring conditions were evaluated by dipping the thermal transfer sheets in water for 1 minute and then drying the same.

TABLE 1

| Thermal Transfer Sheet | Clearness | Waterproof Property |
|---|---|---|
| Example 2 | Good | Good |
| Example 3 | Good | Good |
| Example 4 | Good | Good |
| Comparative Example | Good | Not Good |

As is apparent from the above test evaluation results, according to the present invention, a thermal transfer sheet having an excellent printed image in clearness and waterproof property can be provided by using specific pigments as a coloring agent for the heat fusible ink layer of the thermal transfer sheet.

What is claimed is:

1. An ink composition for a thermal transfer sheet comprising:

a coloring agent comprising a violet pigment expressed by a following formula:

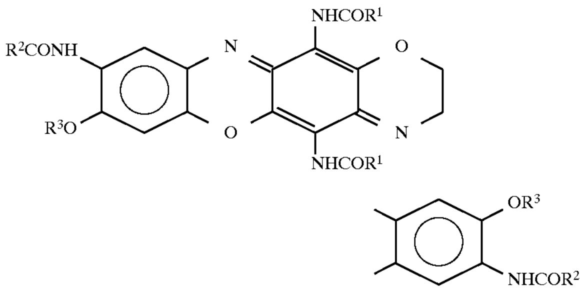

(in the formula, each of $R^1$ and $R^3$ is any one of a methyl and an ethyl and $R^2$ is a phenyl); and a heat fusible binder mainly comprising a wax.

2. An ink composition according to claim 1, wherein said violet pigment has an oil absorption property of 30–60 g/100 g (oil/pigment).

3. An ink composition according to claim 1, wherein amounts of said violet pigment and said heat fusible binder are in ranges of 1–50 weight parts and 10–100 weight parts, respectively.

4. A thermal transfer sheet comprising:

a substrate film; and a heat fusible ink layer disposed on one surface of the substrate film, said heat fusible ink layer being formed from an ink composition which comprises a coloring agent and a heat fusible binder, said coloring agent comprising a violet pigment expressed by a following formula:

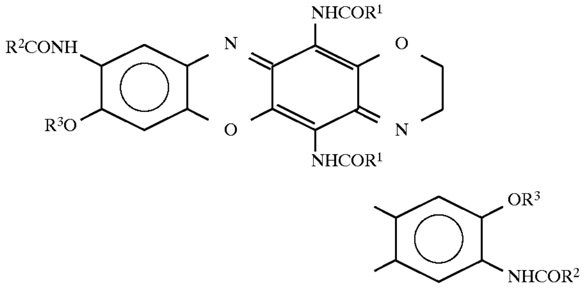

(in the formula, each of $R^1$ and $R^3$ is any one of a methyl and an ethyl and $R^2$ is a phenyl), and said heat fusible binder being mainly comprising a wax.

5. A thermal transfer sheet according to claim 4, wherein said violet pigment has an oil absorption property of 30–60 g/100 g (oil/pigment).

6. A thermal transfer sheet according to claim 4, wherein amounts of said violet pigment and said heat fusible binder are in ranges of 1–50 weight parts and 10–100 weight parts, respectively.

7. A thermal transfer sheet according to claim 4, further comprising a transfer-receiving material which is peelably bonded to a surface side of said heat fusible ink layer of the thermal transfer sheet.

* * * * *